United States Patent
Bame

(10) Patent No.: US 6,299,122 B1
(45) Date of Patent: Oct. 9, 2001

(54) SPHERICALLY MOUNTED RETROREFLECTOR EDGE ADAPTER

(75) Inventor: Michael David Bame, Hollywood, CA (US)

(73) Assignee: Northrup Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/407,145

(22) Filed: Sep. 28, 1999

(51) Int. Cl.[7] ................................................... G02B 5/00
(52) U.S. Cl. ........................ 248/466; 248/467; 356/256; 359/896
(58) Field of Search ................................... 248/466, 467; 33/293; 356/375, 376; 359/515

(56) References Cited

U.S. PATENT DOCUMENTS

| | | | |
|---|---|---|---|
| 3,188,739 | 6/1965 | Olsen et al. | 33/74 |
| 3,861,808 | * 1/1975 | Halsey | 356/169 |
| 4,457,625 | 7/1984 | Greenleaf et al. | 356/360 |
| 4,889,409 | 12/1989 | Atcheson | 350/104 |
| 4,964,218 | 10/1990 | Morghen | 33/293 |
| 5,073,005 | 12/1991 | Hubbs | 359/515 |
| 5,119,564 | 6/1992 | Hamilton et al. | 33/293 |
| 5,305,091 | 4/1994 | Gelbart et al. | 356/375 |
| 5,502,598 | * 3/1996 | Kimura et al. | 359/814 |
| 5,530,549 | 6/1996 | Brown | 356/376 |
| 5,771,099 | * 7/1998 | Ehbets | 356/375 |
| 5,861,956 | 1/1999 | Bridges et al. | 356/375 |
| 5,946,127 | * 8/1999 | Nagata | 359/280 |

* cited by examiner

*Primary Examiner*—Leslie A. Braun
*Assistant Examiner*—Steven Marsh
(74) *Attorney, Agent, or Firm*—Terry J. Anderson; Karl J. Hoch, Jr.

(57) ABSTRACT

In accordance with the present invention, there is provided an edge adapter for use with a spherically mounted retroreflector device for measuring the location of a measurement point on a first object surface of an object. The object has a second object surface with an edge interposed between the first and second object surfaces. The measurement point is positioned an offset distance from the edge. The retroreflector device has a spherical outer surface. The edge adapter is provided with an adapter body having at least two engagement points. The engagement points and the measurement point are cooperatively sized and configured to define a sphere of substantially the same radius as the spherical outer surface. The edge adapter is further provided with an adapter base attached to the adapter body. The adapter base has a base surface formed to engage the first object surface for supporting the edge adapter thereat. The spherical outer surface of the retroreflector device is placed in contact with the engagement points of the adapter body and the measurement point of the first object surface for measuring the location of the measurement point.

19 Claims, 2 Drawing Sheets

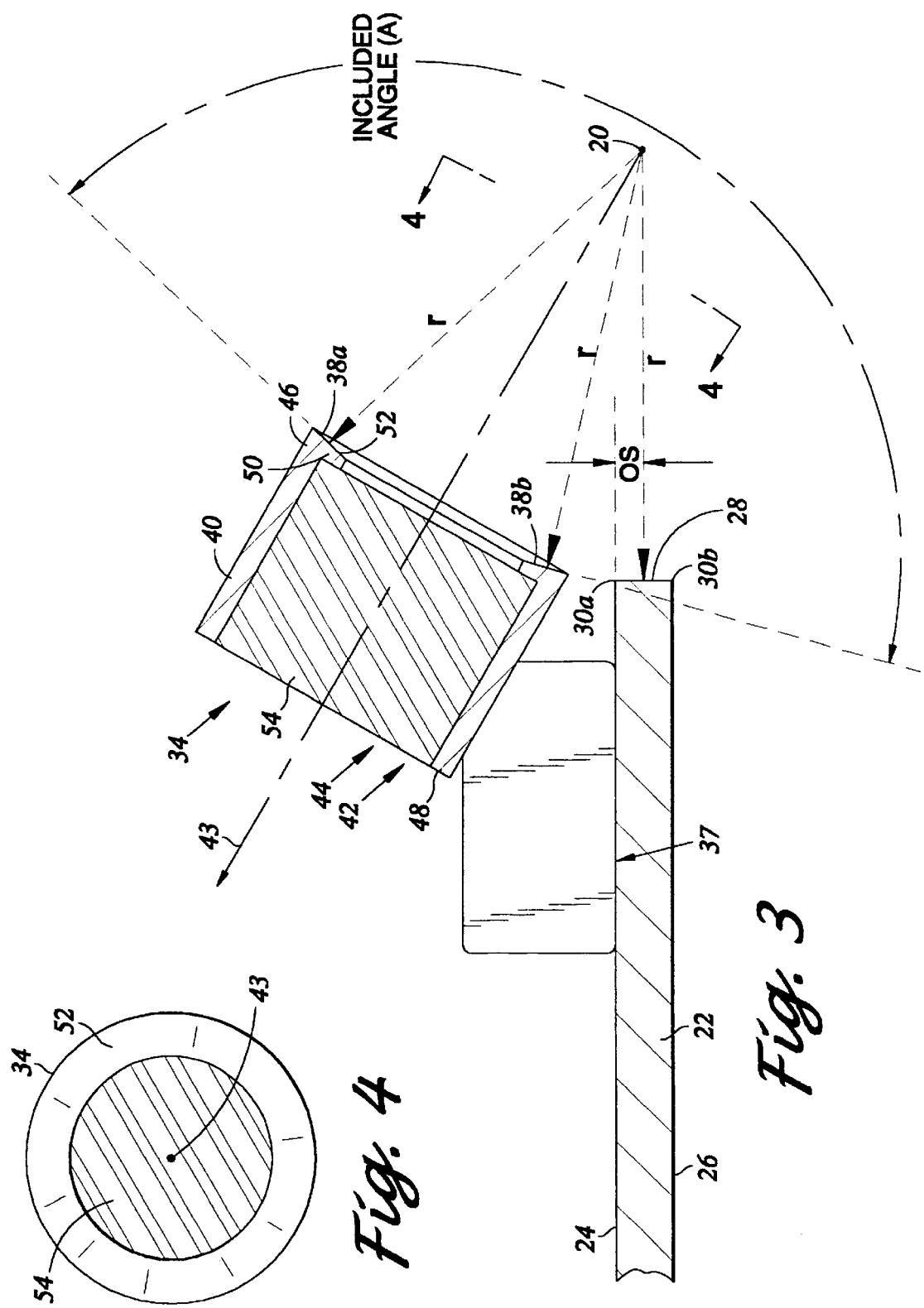

SPHERICALLY MOUNTED RETROREFLECTOR EDGE ADAPTER

FIELD OF THE INVENTION

The present invention relates generally to spherically mounted retroreflectors, and more particularly to a device for adapting a spherically mounted retroreflector for measuring object edges.

BACKGROUND OF THE INVENTION

Optical measuring systems for precisely measuring the three-dimensional surface contour of objects are well known. Such systems commonly optical lasers, such as laser trackers, are cooperatively used with a reflective target. Spherically mounted retroreflectors (SMR) are a commonly used reflective target. Typically, an SMR consists of a retroreflector, such as a corner cube mirror, which is mounted within a steel sphere. The retroreflector is particularly mounted within the sphere such that its vertex is at the center of the sphere. The sphere is provided with an aperture which allows line-of-sight access by the laser to the retroreflector.

The laser tracker is configured to project a laser beam through the aperture at the retroreflector. The laser tracker is further configured to receive a reflected laser beam from the retroreflector. The reflected laser beam is used to determine the location of the vertex of the retroreflector, and therefore the location of the co-located center of the sphere.

In operation, the outer surface of the SMR is placed in contact with the surface contour of the object being measured. The retroreflector is oriented toward the laser tracker. The laser tacker is then used to determine the three-dimensional coordinates of the SMR center. The SMR center is a fixed distance away from the surface contour, which is equal to the radius of the sphere to its outer surface. Thus, the three-dimensional coordinates of the contact point of the SMR sphere on the contour surface can be determined based upon such radial or offset distance. The SMR may be manually moved about the surface contour for mapping additional contact points in order to measure or map the surface contour at intervals of time or distance moved.

The ability to accurately perform measurements is challenging at or near severe changes in the surface contour. In particular, where the object being measured has an edge, measurements taken near the edge present certain difficulties. For example, the object being measured may be a relatively thin sheet structure, such as a panel. The panel is provided with opposing main panel sides which terminate at corner edges. Narrow panel edge surfaces are interposed between the corner edges of the main panel sides. In order to measure the panel edge surfaces using the above described SMR, the operator must attempt to maintain the sphere in contact with them. Where the thickness of the panel edge surfaces is only 0.1 inches, for example, maintaining such contact may be extremely challenging. The reason is that because of the relatively narrow geometry of the panel edge surface, the sphere has a tendency to slide off resulting in disengagement of contact.

A device called a "pin nest" is a prior art attempt to address this problem. The pin nest is used to aid in positioning the SMR when taking measurements of such narrow panel edge surfaces. The pin nest is generally cylindrical shaped. The diameter of a standard pin nest is about one and one half inches. The pin nest has an open end and a closed end which defines a pin nest base. A steel pin protrudes perpendicularly from the pin nest base along the axis of radial symmetry of the pin nest. The pin may be 0.25" in diameter and is defined by a cylindrical outer surface.

In use, the pin nest is placed on the object by resting a portion of the pin nest base upon the panel side with the pin extending over the corner edge. The outer surface of the pin is placed in contact with the panel edge surface to be measured. The SMR is placed in the pin nest by placing the SMR sphere within the open end of the pin nest. Thus, the SMR sphere is cupped by the open end and is centered over the pin. The laser tracker is then used to measure the location of the retroreflector. The pin nest with the SMR is then moved along the corner edge while maintaining contact with the pin to the panel edge surface to take additional measurements.

In theory, the points measured with the laser tracker and the pin nest are at a known location. This is because the pin nest is configured to position the SMR a "fixed" distance above the panel side and a "fixed" distance away from the panel edge surface (equal to the radius of the pin). In practice, however, the accuracy of the measurements relies on several assumptions regarding the geometry of the object being measured. Erroneous measurements will result if the operator does not properly position the pin nest upon the panel side. If the surface that the pin nest sits on is curved, then it is easy for an operator to inadvertently rock the nest. Thus, in using such a pin nest, it is assumed that the panel side that the nest sits on is flat. In addition, as the pin protrudes perpendicularly from the base of the pin nest, it is further assumed that the edge surface is normal to the panel side that the nest sits on. Thus, if the edge surface is not square to the panel side, then the offset introduced by the pin will not be at a "known" location. Moreover, in general, laser tracker measurement accuracy is greatest and there is the least opportunity for error if the SMR is in direct contact with the surface being measured.

Accordingly, there is a need in the art for an improved adapter which can be used with an SMR for taking surface measurements which are adjacent to an edge of an object.

SUMMARY OF THE INVENTION

In accordance with the present invention, there is provided an edge adapter for use with a spherically mounted retroreflector device for measuring the location of a measurement point on a first object surface of an object. The object has a second object surface with an edge interposed between the first and second object surfaces. The measurement point is positioned an offset distance from the edge. The retroreflector device has a spherical outer surface. The edge adapter is provided with an adapter body having at least two engagement points. The engagement points and the measurement point are cooperatively sized and configured to define a sphere of the same radius as the spherical outer surface. The edge adapter is further provided with an adapter base attached to the adapter body. The adapter base has a base surface formed to engage the first object surface for supporting the edge adapter thereat. The spherical outer surface of the retroreflector device is placed in contact with the engagement points of the adapter body and the measurement point of the first object surface for measuring the location of the measurement point.

In the preferred embodiment of the present invention, the adapter body is generally-cylindrical and has a central bore disposed therethrough. The at least two engagement points are disposed along a ring portion of the adapter body. Thus, the ring portion is used to engage the spherical outer surface of the retroreflector device in a cupping manner.

The SMR adapter constructed in accordance with the present invention presents numerous advantages not found in the related prior art. In this respect, the present invention is particularly adapted to facilitate measurement of narrow edge surfaces or portions of surfaces which are close to an edge. Advantageously, in using the SMR edge adapter, the SMR is allowed to maintain direct contact with the point on the surface being measured. As such, positional errors introduced by the use of such an edge adapter is mitigated in comparison to the prior art. In use, the operator need only verify that the SMR sphere is in contact with the surface being measured in order to achieve a high degree of accuracy of measurements taken with the SMR. This is unlike a prior art device such a pin nest where the operator needs to carefully position the pin nest upon a first surface and the pin nest pin upon an adjoining second surface. In addition, the present invention may be used to measure object surfaces which are not completely flat and having curvatures, as well as those objects which have edges which are not at precise right angles (e.g., beveled or rounded). This is again because the use of the present edge adapter allows for the SMR to be in direct contact with the object surface being measured.

As such, the edge adapter constructed in accordance with the present invention represents a significant advancement in the art.

BRIEF DESCRIPTION OF THE DRAWINGS

These, as well as other features of the present invention, will become more apparent upon reference to the drawings wherein:

FIG. 3 is an enlarged cross-sectional side view of the SMR edge adapter; and

FIG. 4 is an end view of the adapter body of the SMR edge adapter as seen along axis 4—4 of FIG. 3.

DETAILED DESCRIPTION OF THE PREFERRED EMBODIMENTS

Figure 1:
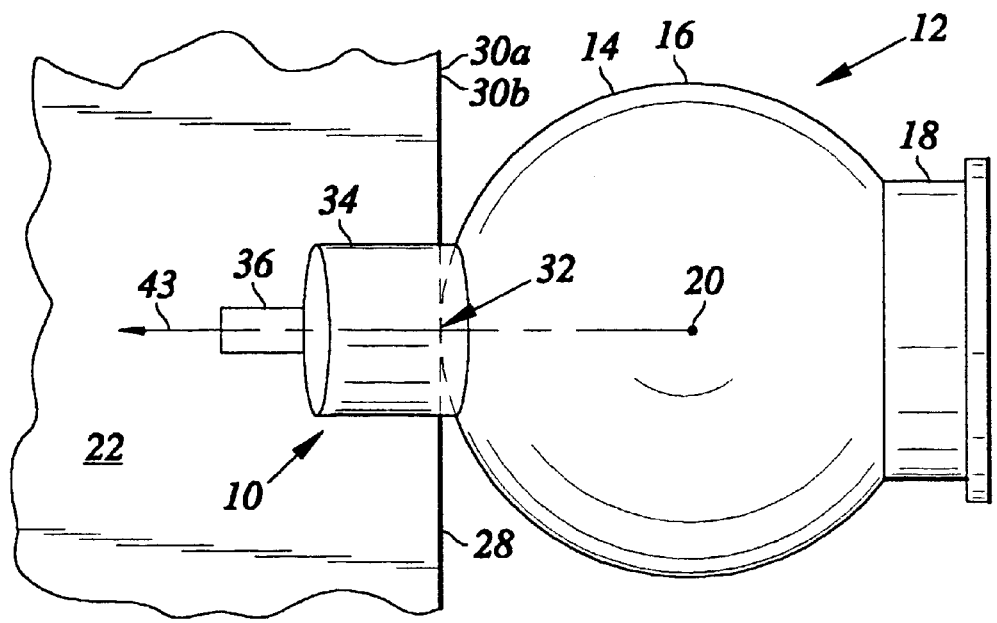
FIG. 1 is a top view of the SMR edge adapter of the present invention shown in its operable position relative to a symbolic SMR device and measurement object.

Referring now to the drawings wherein the showings are for purposes of illustrating preferred embodiments of the present invention only, and not for purposes of limiting the same, FIGS. 1–4 illustrate an SMR edge adapter constructed in accordance with the present invention. As will be described in more detail below, the SMR edge adapter is specifically configured to support an SMR sphere while allowing it to maintain direct contact with the surface being measured which is adjacent to an edge.

Figure 2:
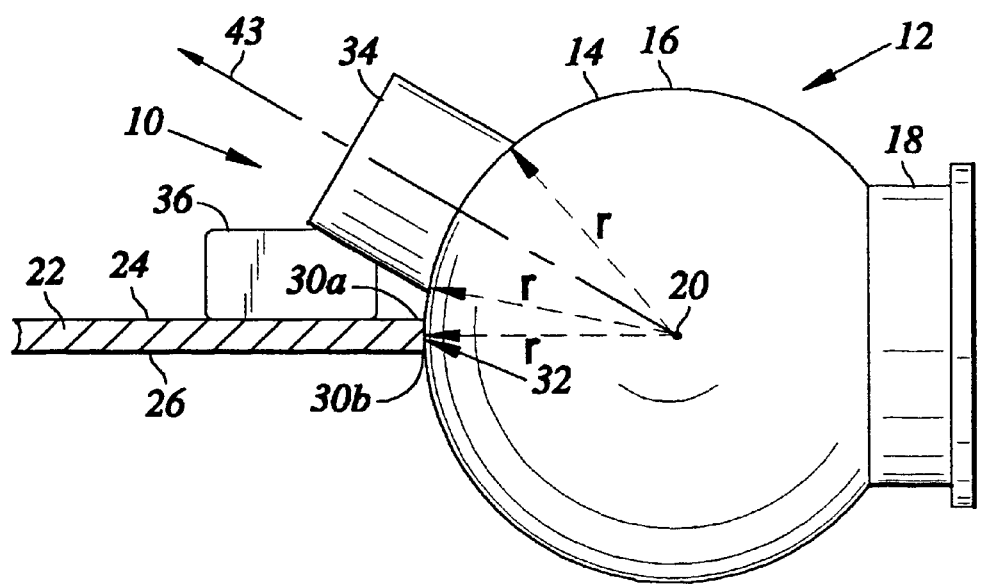
FIG. 2 is cross-sectional side view of the SMR edge adapter of FIG. 1.

In accordance with the present invention, there is provided an edge adapter 10 for use with a spherically mounted retroreflector (SMR) device 12 as symbolically shown in FIGS. 1 and 2. The SMR device 12 is generally defined by a hollow SMR sphere 14 having a spherical outer surface 16. The outer surface 16 is defined by a radius (r) from a center 20 of the sphere 14. The sphere 14 is provided with an aperture 18 which allows line-of-sight access into the interior of the sphere 14. Although not shown, the SMR device 12 is further provided with a retroreflector, such as a corner cube mirror, which is mounted within the sphere 14. As is common, the retroreflector is particularly mounted within the sphere 14 such that its vertex is co-located with the center 20 of the sphere 14. As such, the aperture 18 is configured to allow line-of-sight access by a laser to the retroreflector for measuring the location of the retroreflector vertex. It is contemplated that the SMR device 12 and its sub-components are chosen from those which are well known to one of ordinary skill in the art.

The SMR device 12 is utilized for taking surface measurements of an object. In this regard, there is symbolically depicted an object 22. The exemplary object 22 is shown in the form of a narrow panel. The object 22 is provided with upper and lower sides 24, 26 and a panel edge side 28 interposed there between. As the panel edge side 28 is angularly disposed with respect to the upper and lower sides 24, 26, the object 22 is further provided with corner edges 30a–b thereat.

The present invention is particularly suited to facilitate the taking of measurements near the abrupt surface contour changes, such as near corner edges 30a–b on the panel edge side 28. In this regard, there is provided a representative measurement-point 32 which is positioned an offset distance (OS) from the corner edge 30a. Where that thickness of the panel edge side 28 is on the order of 0.1 inches, for example, the offset distance may be about 0.06 inches.

Referring now to the enlarged cross-sectional view of FIG. 3, the edge adapter 10 is provided with an adapter body 34. The adapter body 34 is attached to an adapter base 36 for supporting the adapter body 34 against the outer surface 16 of the sphere 14. Note that the sphere 14 is not shown in FIG. 3 in order to more clearly depict the edge adapter 10. In this respect, the edge adapter 10 is shown in geometrical reference to the center 20 of the sphere 14. The adapter base 36 is provided with a base surface 37 thereof. The base surface 37 is configured to rest upon the object 22, and in particular, the upper side 24 of the exemplar object 22. The adapter body 34 has at least two engagement points 38a–b. The engagement points 38a–b and the measurement point 32 are cooperatively sized and configured to define a sphere of the same radius (r) as that of the spherical outer surface 16. In this respect, the engagement points 38a–b shown in FIG. 3 are representative in nature as such at least two engagement points 38a–b are of a family of possible locations.

In the preferred embodiment of the present invention, the adapter body 34 is generally defined by a cylindrical outer wall 40 thereof. The cylindrical outer wall 40 has a central bore 42 defining a cavity 44 therein. The central bore 42 is characterized by an axis of radial symmetry 43. The adapter body 34 further has a first end 46 and an opposing second end 48. The cavity 44 extends through the second end 48 terminates at a lip section 50 disposed at the first end. The lip section 50 defines a ring portion 52 of the adapter body 34. The at least two engagement points 38a–b are disposed along the ring portion 52 of the adapter body 34. In this regard, the ring portion 52 is concentrically centered about the axis of symmetry 43 of the central bore 42. As such, the ring portion 52 is configured to engage the spherical outer surface 16 of the SMR device 12. Further, the axis of radial symmetry is configured to extend through the sphere center 20 when the sphere outer surface 16 is engaged with the ring portion 52. The ring portion 52 preferably has a radius less than that of the spherical outer surface 16. The ring portion 52 may take the form of a conical surface for engaging the spherical outer surface 16. The conical ring surface 52 defines an included angle (A) which is preferably sized and configured to minimize the average air gap between the spherical SMR surface 16 and the ring surface 52 to facilitate magnetic contact therebetween. Alternatively, the ring portion 52 could be formed to conform to a spherical surfaced having a radius (R).

In practice, the spherical outer surface 16 of the SMR device 12 is placed in contact with the adapter body 34, and in particular, the ring portion 52 thereof, and the measurement point 32. As such, the outer surface 16 is configured to be cupped by or otherwise seated with the ring portion 52.

In the preferred embodiment of the present invention, the edge adapter 10 further comprises an engagement device for engaging the edge adapter 10 with the sphere 14. Preferably, the edge adapter 10 is provided with a magnet 54 for engaging the edge adapter 10 with the sphere 14. The magnet 54 is disposed within the cavity 44 as defined by the central bore 42 and is seated against the lip section 50. Preferably, the magnet 54 does not directly contact the outer surface 16. In this regard, it is contemplated that the adapter body 34 is formed of a magnetically conductive material, such as steel, and the magnet 54 is magnetically engaged with the adapter body 34. As such, the adapter body 34 may be configured to be magnetically attached to the outer surface 16 of the sphere 14. It is contemplated that the sphere 14 is typically formed of a magnetically conductive material, such as a metal. Thus, in practice, the ring portion 52 may be magnetically engaged with the outer surface 16.

As mentioned above, the edge adapter 10 is provided with the adapter base 36 having the base surface 37 thereof. The base surface 37 is configured to rest upon the object 22. In regard, in practice, the adapter base 36 may be slid across the upper side 24 in order to take multiple measurements along the panel edge side 28 of the object 22. It is desired that the base surface 37 be constructed of a material which does not tend to damage or otherwise scratch the upper side 24 of object 22 as it is moved thereabout. As such, the base surface 37 and more generally the adapter base 36 may be formed of a plastic material for mitigating potential damage to the object 22 being measured. Other suitable material selections may be chosen from those which are well known to one of ordinary skill in the art which have a sufficient structural integrity and durability to maintain the adapter body 34 in its operable position and yet have a hardness less than that of most metals.

As mentioned above, the present invention is particularly suited to facilitate the taking of measurements near abrupt surface contour changes, such as near corner edges 30*a–b* on the panel edge side 28. In this regard, the panel edge side 28 is depicted as being perpendicular to the upper side 24. It is contemplated, however, that the surface which contains the measurement point 32 (e.g., the panel edge side 28 as depicted) and the surface upon which the edge adapter 10 rests upon (e.g., the upper surface 24) need not be perpendicular to each other as depicted. In this regard, such surfaces may be angularly disposed, or even curved, with respect to each other. Where such surfaces are not perpendicular to each other, it is contemplated that the edge adapter 10 may be configured to accommodate such geometries. In this regard, where such surfaces are angularly disposed, this would have the effect of requiring the adapter base 36 to support the adapter body 34 at a different angular disposition. In particular, the adapter body would need to be supported at an angle so as to facilitate that axis of radial symmetry 43 thereof to be disposed through the sphere center 20. It is contemplated that the operational location of the sphere center 20 is disposed along a line perpendicular from the measurement point 32.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An edge adapter in combination with a spherically mounted retroreflector device for measuring the location of a measurement point on a first object surface of an object, the object having a second object surface with an edge interposed between the first and second object surfaces, the measurement point being positioned an offset distance from the edge, the retroreflector device having a spherical outer surface, the edge adapter comprising:

an adapter body having at least two engagement points, the engagement points and the measurement point being cooperatively sized and configured to define a sphere of substantially the same radius as the spherical outer surface; and an adapter base attached to the adapter body, the adapter base having a base surface formed to engage the first object surface for supporting the edge adapter thereat;

wherein the spherical outer surface of the retroreflector device being placed in contact with the engagement points of the adapter body and the measurement point of the first object surface for measuring the location of the measurement point.

2. The edge adapter of claim 1 wherein the adapter body has a ring portion for engaging the spherical outer surface of the retroreflector device, the at least two engagement points are disposed along the ring portion.

3. The edge adapter of claim 2 wherein the ring portion has a radius less than that of the spherical outer surface.

4. The edge adapter of claim 2 wherein the ring portion has a conical surface for engaging the spherical outer surface of the retroreflector device.

5. The edge adapter of claim 1 wherein the adapter body is generally cylindrical.

6. The edge adapter of claim 5 wherein the adapter body has a central bore disposed therethrough.

7. The edge adapter of claim 6 wherein the adapter further comprises a magnet attached to the edge adapter with the retroreflector device.

8. The edge adapter of claim 7 wherein the magnet is disposed within the central bore.

9. The edge adapter of claim 1 further comprising an engagement device for engaging the edge adapter with the retroreflector device.

10. The edge adapter of claim 9 wherein the engagement device is a magnet.

11. The edge adapter of claim 10 wherein the adapter body is formed of a metallic material.

12. The edge adapter of claim 1 wherein the first and second surfaces are disposed perpendicular to each other.

13. The edge adapter of claim 1 wherein the offset distance is about 0.06 inches.

14. The edge adapter of claim 1 wherein the adapter base is formed of plastic.

15. An edge adapter in combination with a spherically mounted retroreflector device for measuring the location of a measurement point on a first object surface of an object, the object having a second object surface with an edge interposed between the first and second object surfaces, the measurement point being positioned an offset distance from the edge, the retroreflector device having a spherical outer surface, the edge adapter comprising:

an adapter body having a circular end, the circular end defining a ring portion, the ring portion and the measurement point being cooperatively sized and configured to define a sphere of substantially the same radius as the spherical outer surface; and an adapter base attached to the adapter body, the adapter base having a base surface formed to engage the first object surface for supporting the edge adapter thereat;

wherein the spherical outer surface of the retroreflector being placed in contact with the ring portion and the measurement point of the first object surface for measuring the location of the measurement point.

16. The edge adapter of claim 15 wherein the ring portion has a radius less than that of the spherical outer surface.

17. The edge adapter of claim 15 wherein the ring portion has a conical surface for engaging the spherical outer surface of the retroreflector device.

18. The edge adapter of claim 15 wherein the adapter body is generally cylindrical.

19. The edge adapter of claim 18 wherein the adapter body has a central bore disposed therethrough.

* * * * *